US008438919B2

(12) United States Patent
Phillips et al.

(10) Patent No.: US 8,438,919 B2
(45) Date of Patent: May 14, 2013

(54) SYSTEMS AND METHODS FOR LIQUID LEVEL SENSING HAVING A DIFFERENTIATING OUTPUT

(75) Inventors: Richard W. Phillips, Eagan, MN (US); Chansay Em, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 227 days.

(21) Appl. No.: 12/842,308

(22) Filed: Jul. 23, 2010

(65) Prior Publication Data

US 2012/0017675 A1 Jan. 26, 2012

(51) Int. Cl.
*G01F 23/00* (2006.01)

(52) U.S. Cl.
USPC .......................................................... 73/295

(58) Field of Classification Search ............ 73/292, 73/295; 374/141, 142
See application file for complete search history.

(56) References Cited

U.S. PATENT DOCUMENTS

| 4,205,237 A | | 5/1980 | Miller | |
|---|---|---|---|---|
| 4,358,955 A | * | 11/1982 | Rait | 73/295 |
| 4,452,176 A | | 6/1984 | Hoefelmayr et al. | |
| 6,536,276 B2 | * | 3/2003 | Huss et al. | 73/295 |
| 7,302,846 B2 | * | 12/2007 | Hadala | 73/295 |
| 2003/0046997 A1 | | 3/2003 | Waller | |
| 2007/0157706 A1 | * | 7/2007 | Yanagi et al. | 73/49.2 |
| 2008/0016960 A1 | | 1/2008 | Zimmermann et al. | |
| 2008/0250798 A1 | * | 10/2008 | Okoren et al. | 62/129 |

FOREIGN PATENT DOCUMENTS

| DE | 869 701 | 3/1953 |
|---|---|---|
| DE | 102 36 173 | 4/2003 |
| EP | 1 645 852 | 4/2006 |
| WO | WO 2009/135562 | 11/2009 |

OTHER PUBLICATIONS

European Search Report dated May 16, 2012.

* cited by examiner

*Primary Examiner* — Hezron E Williams
*Assistant Examiner* — David Z Huang
(74) *Attorney, Agent, or Firm* — Edwards Wildman Palmer LLP; Scott D. Wofsy; Joshua L. Jones (57) ABSTRACT

A liquid level sensing system including a housing configured to hold a liquid, a first temperature sensor connected to the housing and configured to output a first signal representing a first temperature measured at the first temperature sensor, a second temperature sensor connected to the housing and configured to output a second signal representing a second temperature measured at the second temperature sensor, and a circuit configured to receive the first and second signals as input and to provide an output signal proportional to the time rate of change of the difference between the first signal and the second signal.

22 Claims, 9 Drawing Sheets

SYSTEMS AND METHODS FOR LIQUID LEVEL SENSING HAVING A DIFFERENTIATING OUTPUT

BACKGROUND OF THE INVENTION

1. Field of the Invention

The present invention relates to discrete point liquid level sensing within an enclosure, and more particularly to a rapid-response liquid level sensing system that includes two temperature sensing probes and a circuit that produces an output proportional to the time rate of change of the difference between the two signals received from the temperature sensing probes.

2. Description of Related Art

For aerospace launch vehicle applications using liquid propellant, precisely determining when a fuel tank has been depleted during flight is critically important to ensure proper engine cutoff. Typically, several sensors within a fuel tank of the launch vehicle monitor the liquid level in the fuel tank as the fuel exits the tank. The sensors function to prevent the engines of the launch vehicle from shutting down either too early or too late. An early shutdown could prevent the launch vehicle from reaching orbit; a late shutdown could result in an engine failure.

Conventional liquid level sensing systems for launch vehicle applications use a bare wire sensing element that adequately meets system response requirements (<160 ms), but is very fragile. The bare wire sensing element consists of a thin platinum wire wrapped loosely around a ceramic card. The wire diameter is extremely thin—about the width of a human hair. The thermal mass of the thin wire is very small, which means that the response time of the sensing element is fast because liquid is quickly shed from the sensing element during the transition from liquid to gas. However, the fragility of the conventional sensing element is problematic, especially for newer launch vehicles that experience significantly higher pyrotechnic shock levels. In addition, at cryogenic temperatures, the low resistance (~1 ohm) of the conventional liquid level sensors interferes with circuit fault detection.

There is a compelling need for a liquid level sensing system that provides sufficiently fast response times with higher resistance, while being rugged enough to endure high mechanical shock levels. The present invention addresses this need.

SUMMARY OF THE INVENTION

This disclosure is directed to systems and methods for liquid level sensing using a differentiating output. The systems and methods will be more readily apparent to those having ordinary skill in the art from the following detailed description of the invention taken in conjunction with the several drawings described below.

A liquid level sensing system is described below. The liquid level sensing system includes a housing or tank configured to hold a liquid, a first temperature sensor connected to the housing and configured to output a first signal representing a first temperature measured at the first temperature sensor, a second temperature sensor connected to the housing and configured to output a second signal representing a second temperature measured at the second temperature sensor, and a circuit configured to receive the first and second signals as input and to provide an output signal proportional to the time rate of change of the difference between the first signal and the second signal.

A method of determining the level of liquid in a tank as the liquid drains from the tank is also provided. The method includes the steps of providing a tank having a housing; providing a first temperature sensor and a second temperature sensor, each sensor being connected to the housing and being spaced apart a predetermined distance from one another in the direction of liquid level velocity in the tank; continuously measuring a first temperature at the first temperature sensor; continuously measuring a second temperature at the second temperature sensor; providing a circuit configured to receive a first input signal from the first temperature sensor representing the first temperature and a second input signal from the second temperature sensor representing the second temperature; and manipulating the first and second input signals within the circuit to provide an output signal proportional to the time rate of change of the difference between the first signal and the second signal.

A fuel level sensing system for detecting the filling and draining of fuel within a tank is also provided. The system includes a fuel tank configured to hold a quantity of liquid fuel, a depletion sensing unit mounted within the tank near a bottom portion of the tank, and a filling sensing unit mounted within the tank near a top portion of the tank. The depletion sensing unit includes a first temperature sensor configured to output a first signal representing a first temperature measured at the first temperature sensor, a second temperature sensor configured to output a second signal representing a second temperature measured at the second temperature sensor, and a first circuit configured to receive the first and second signals as input and to provide a first output signal proportional to the time rate of change of the difference between the first signal and the second signal. The filling sensor unit includes a third temperature sensor configured to output a third signal representing a third temperature measured at the third temperature sensor, a fourth temperature sensor configured to output a fourth signal representing a fourth temperature measured at the fourth temperature sensor, and a second circuit configured to receive the third and fourth signals as input and to provide a second output signal proportional to the time rate of change of the difference between the third signal and the fourth signal.

BRIEF DESCRIPTION OF THE DRAWINGS

So that those skilled in the art will readily understand how to implement the systems and methods for liquid level sensing having a differentiating output without undue experimentation, preferred embodiments of the systems and methods will be described in detail below with reference to the following figures.

DETAILED DESCRIPTION OF THE PREFERRED EMBODIMENTS

This disclosure describes a liquid level sensing system that uses a plurality of discrete-point level sensing elements to rapidly detect the transition from liquid to gas or from gas to liquid within a tank or other enclosure by using a differentiating technique.

Figure 1:
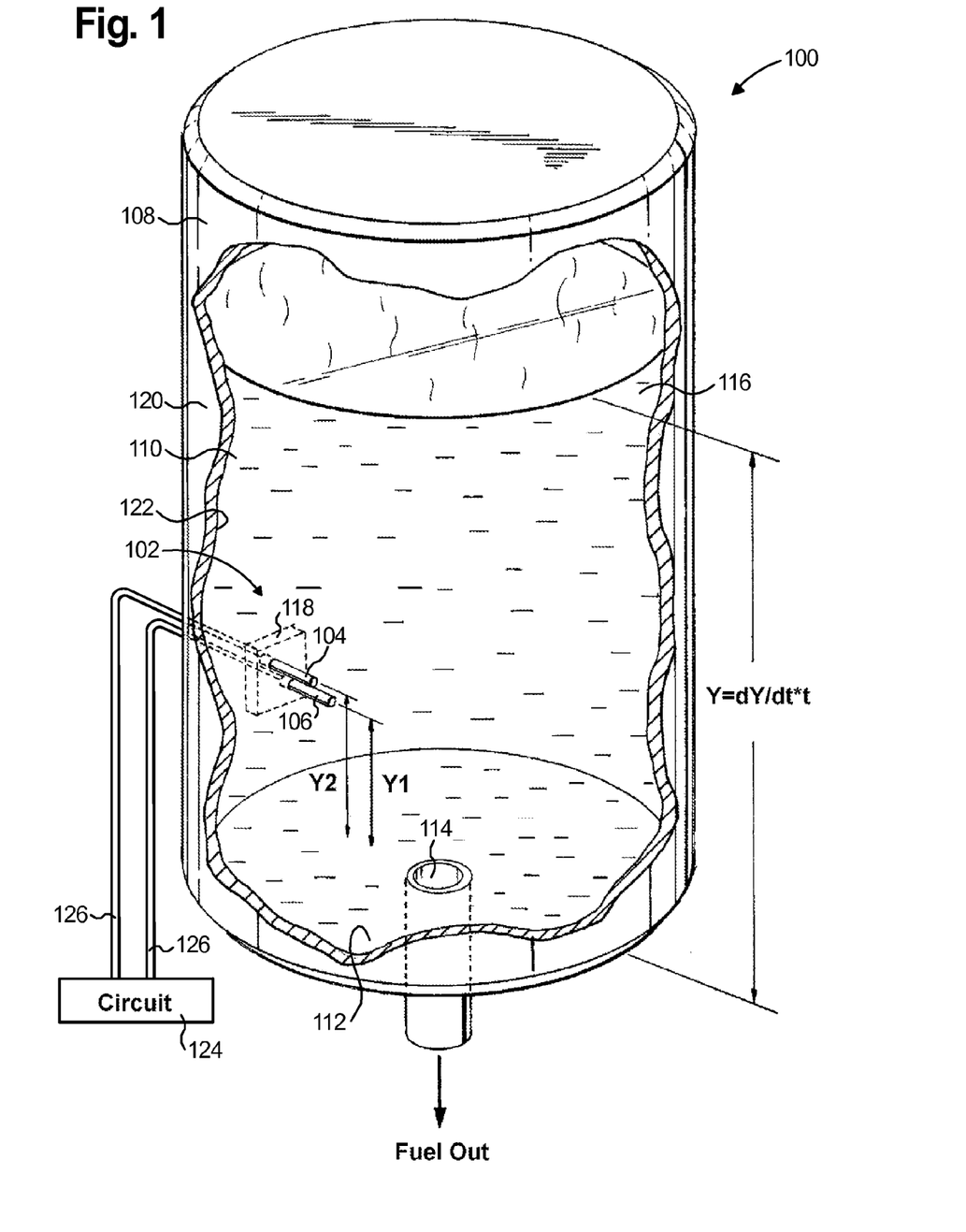
FIG. 1 is a cut-away perspective view of a fuel tank that includes an exemplary embodiment of the liquid level sensing system of the present invention.

Reference will now be made in detail to the present preferred embodiments of the liquid level sensing system, examples of which are shown in the drawings. For purposes of explanation and illustration, and not limitation, a perspective view of a first exemplary embodiment of the liquid level sensing system of the present invention is shown in FIG. 1 and is designated generally by reference numeral 100.

System 100 includes a sensing unit 102 having a first sensing probe 104 and a second sensing probe 106. Sensing unit 102 is mounted within a liquid holding tank 108 having at least one side wall 110 and a floor 112, with an outlet orifice 114 formed within floor 112 to allow a liquid 116 to exit the tank 108. As shown in FIG. 1, tank 108 may be a cylindrical enclosed tank configured to hold a predetermined quantity of liquid 116. Outlet orifice 114 may interface with a valve or other mechanism that allows for the control of the flow of liquid 116 out of tank 108.

Liquid level sensing system 100 is well-suited for measuring fuel levels within a fuel tank, especially in aerospace applications. For example, liquid tank 108 may be a fuel tank that forms a part of a launch vehicle. Tank 108 may hold a liquid hydrogen fuel, a liquid oxygen oxidizer, or other suitable liquid propellants. Outlet orifice 114 may be in fluid communication with a combustion chamber, where the liquid fuel draining from tank 108 is ignited to form hot, high temperature gases that are then expanded and accelerated through a nozzle to create thrust for the launch vehicle.

Sensing unit 102 may include a base 118 (shown in phantom in FIG. 1) mounted to an outer surface 120 of side wall 110 or to another structural member, with first and second sensing probes 104, 106 mounted to base 118 and extending through an interior surface 122 of sidewall 110 such that sensing probes 104, 106 extend a predetermined distance into the interior of tank 108. Each of the sensing probes 104, 106 may interface with a circuit 124 through one or more leads 126 or by other suitable means.

Figure 2:
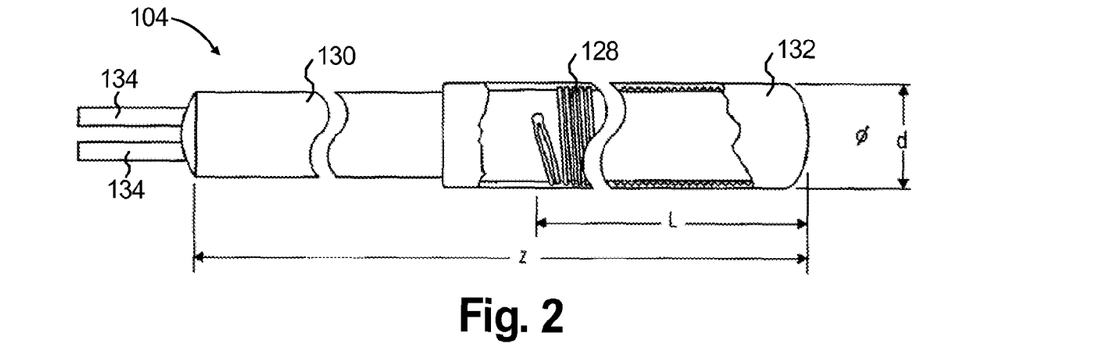
FIG. 2 shows an exemplary embodiment of a resistance element that may be used in the liquid sensing system of FIG. 1.

Sensing unit 102 functions as a discrete point level sensor capable of detecting the transitions from gas to liquid and liquid to gas within tank 108. In one exemplary embodiment, sensing probes 104, 106 are identical sensing probes as shown in FIG. 2, having a length z and a diameter d. Each sensing probe 104, 106 may also include a sensing element 128. Sensing element 128 may be a thermistor, a diode, or any other suitable temperature resistance element such as wound wire made from platinum, nickel, or other suitable material. In one exemplary embodiment, sensing element may be deposited as a film. Sensing probes 104, 106 may be elongated and cylindrical in shape with a proximal end 130 mounted to base 118 of sensing unit 102 and a distal end 132 extending into the interior of tank 108. As shown in FIG. 2, each sensing probe 104, 106 may include a sensing element that includes a wire wound around distal end 132 of the sensing probe for a distance L along the length z of the sensing probe. Each sensing element 128 may be electrically connected to lead 126 and circuit 124 via connectors 134 on proximal end 130 of the sensing probe.

System 100 exploits the self-heating characteristics of sensing element 128 to determine the liquid level within tank 108. Because the heat transfer properties of gas and liquid are different, the rate of self heating of sensing element 128 depends on whether sensing element 128 is immersed in gas or liquid. Each sensing element 128 of sensing probes 104, 106 is supplied with a constant excitation current sufficient to provide measurable self heating in gas. The degree of self heating is proportional to the power dissipation of sensing element 128, which depends on the element resistance, excitation current, and boundary conditions (liquid or gas). As liquid 116 drains from tank 108, first sensing probe 104 and second sensing probe 106 each transition from being immersed in liquid to being surrounded completely by gas. When sensing probes 104, 106 are surrounded by gas, the resistance heating produced by sensing element 128 increases, and the sensed temperature of each element increases. For example, for a sensing probe having an outer diameter of 0.06 inches, the self-heating rate in liquid nitrogen is 0.028° C./mW, while the self-heating rate in gaseous nitrogen is 0.213° C./mW. Each sensing probe 104, 106 produces an output signal proportional to the temperature present at the sensing element on the probe.

The liquid-to-gas response time of each sensing probe may be influenced by the wetting of the sensing element on the probe, that is, the tendency of the liquid to stick to the surface of the sensing element on the sensing probe. As the element emerges from the liquid, any liquid that clings to the surface will cause a delay in the response time as the liquid evaporates. This effect can be mitigated in several ways: a small resistive element can be used to minimize surface area and increase watt density; a sensing probe having a smooth surface contour can be used so that there are no cavities to trap liquid; the excitation current provided to the sensing elements on the probe can be increased, which in turn increases the power and rate of evaporation; and a non-wetting coating such as parylene, can be applied to the sensing probe and sensing element. The low surface tension provided by a non-wetting coating promotes shedding of the liquid from the sensing probe to minimize the influence of wetting.

Figure 3:
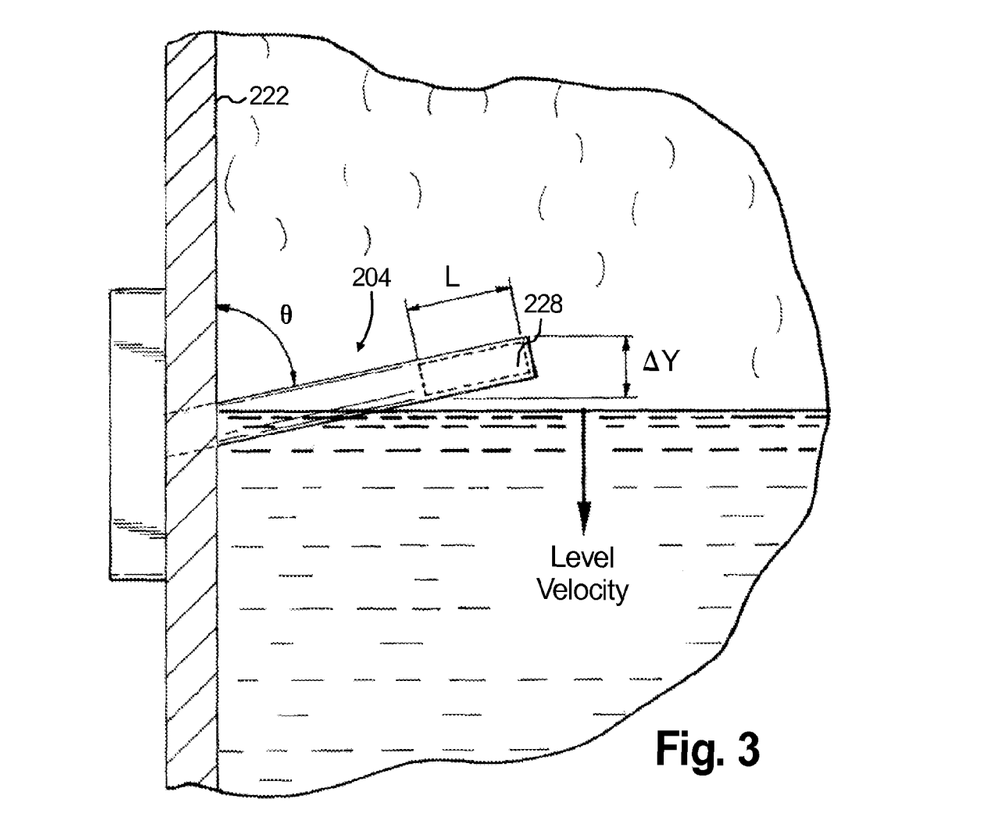
FIG. 3 shows an exemplary embodiment of a sensor of the liquid sensing system of the present invention, mounted at an angle of less than 90 degrees with respect to the direction of liquid level velocity.

FIG. 3 illustrates an additional solution to the wetting problem. As shown, a sensing probe 204 can be mounted at an angle with respect to the liquid level velocity within a tank. In other words, sensing probe 204 is mounted in such a way that it forms an acute angle with an interior surface 222 of the housing of the tank as well as with the liquid level velocity. Liquid level velocity is a vector representing the speed and direction in which the liquid in the tank is moving.

Mounting sensing probe 204 at an angle affects liquid run-off and level detection resolution. By forming an acute angle with respect to the tank housing and the liquid level velocity, or in other words, an angle that is less than 90 degrees, liquid run-off is directed away from a sensing element 228 located on the distal end of the sensing probe, which minimizes the wetting delay. However, mounting the sensing probe at an angle presents a tradeoff, because the resolution $\Delta Y$ may be compromised as the angle deviates from 90 degrees. Resolution ($\Delta Y$) is defined as follows:

$$\Delta Y = \cos(\theta - \theta_0)\sqrt{(L^2 + d^2)}$$

Where $\theta_0 = \tan^{-1}(d/L)$, $\theta$=mounting angle, L=winding length, and d=diameter. The inventors have determined that an optimum angle for mounting the sensing probe to minimize wetting delay without significantly compromising resolution of the sensing element is approximately 75 degrees.

Figure 4:
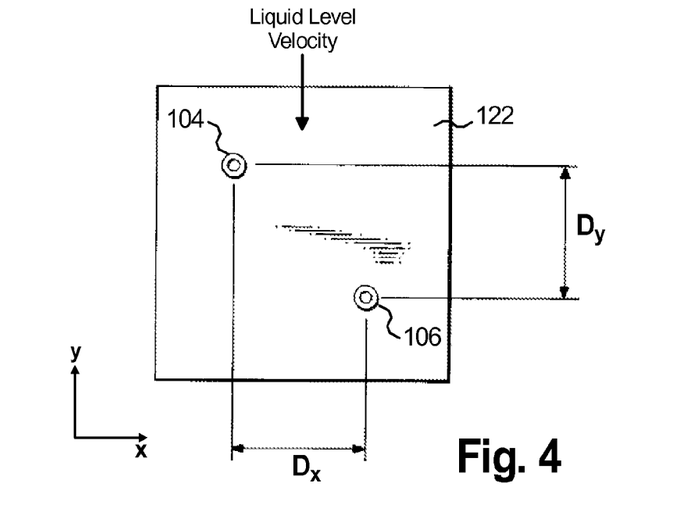
FIG. 4 is a plan view of a portion of the sensing system of the present invention, showing the separation between two sensors in both an x direction and a y direction.

FIG. 4 illustrates an exemplary embodiment of sensing unit 102 of the liquid level sensing system 100 shown in FIG. 1. FIG. 4 shows the relative placement of sensing probes 104 and 106 of the sensing unit. Sensing probes 104 and 106 may be offset in two directions to ensure that both probes are exposed to the same flow of liquid 116 in tank 108. As shown in FIG. 4, first sensing probe 104 may be spaced apart from second sensing probe 106 by a lateral distance along an x axis and a distance $D_y$ along a y axis, with the y axis being parallel to the liquid level velocity of liquid 116 as the liquid drains from tank, and the x axis being perpendicular to the y axis and generally perpendicular to the sensing probes 104, 106. The lateral distance $D_x$ between first sensing probe 104 and second sensing probe 106 is large enough to prevent the wake produced by first sensing probe 104 from affecting the temperature measurement at second sensing probe 106. Properly spacing the sensing probes ensures that both first sensing probe 104 and second sensing probe 106 are exposed to the same flow of liquid 116.

First sensing probe 104 produces an output signal representing a first temperature T1 at the first sensing probe, and second sensing probe 106 produces an output signal representing a second temperature T2 at the second sensing probe. The difference between the two temperatures (T1–T2) is sent as an input signal to circuit 124, which provides an output proportional to the time rate of change of the difference (T1–T2). Using two sensing probes minimizes the influence of changing temperature and flow within tank 108 on the determination of the level of liquid 116 within the tank.

In one exemplary embodiment, sensing elements 128 of first and second sensing probes 104, 106 each have individual time constants (63.2% response) of 10 seconds, provide a liquid to gas self-heating rise of 20 kelvin (K), and are positioned within the tank 10 seconds apart. In other words, as liquid 116 drains from tank 108, the liquid level reaches second sensing probe 106 ten seconds after reaching first sensing probe 104.

Figure 5:
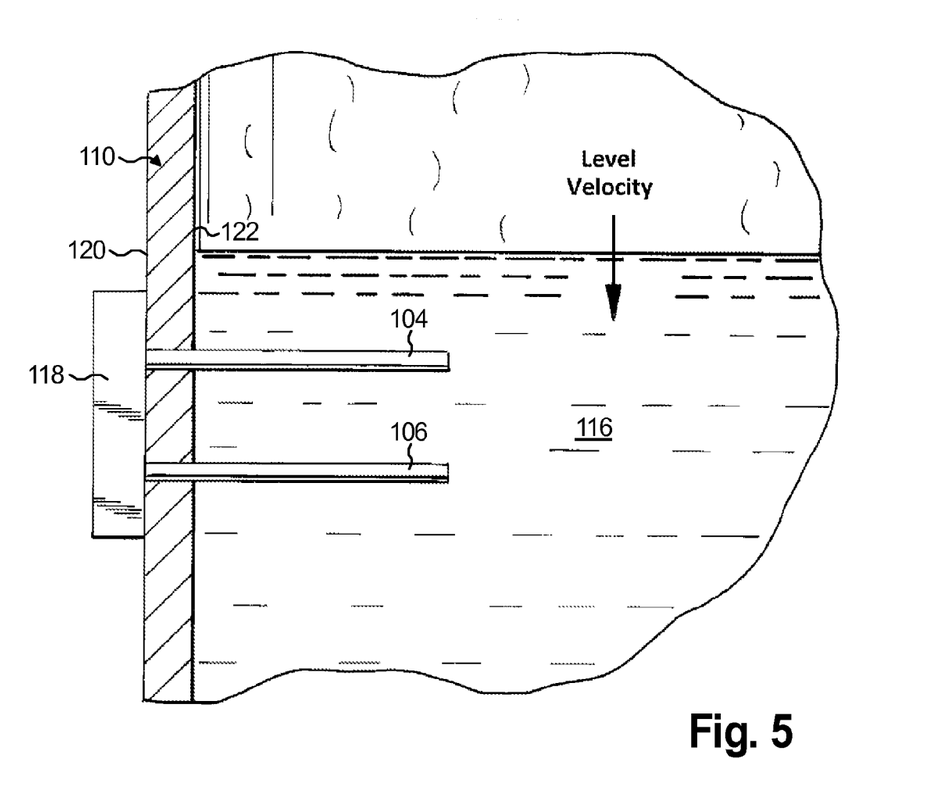
FIG. 5 is a cross-sectional view of the fuel tank of FIG. 1, showing two sensors spaced apart from one another, with the level of liquid in the tank above both of the sensors.
Figure 6:
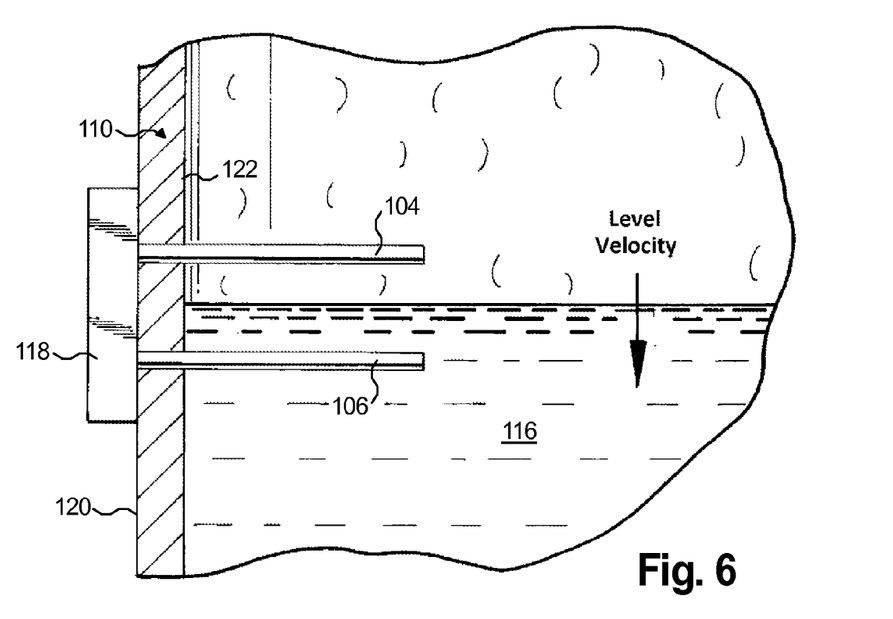
FIG. 6 is a cross-sectional view of the fuel tank of FIG. 1, showing two sensors spaced apart from one another, with the level of liquid in the tank between the two sensors.
Figure 7:
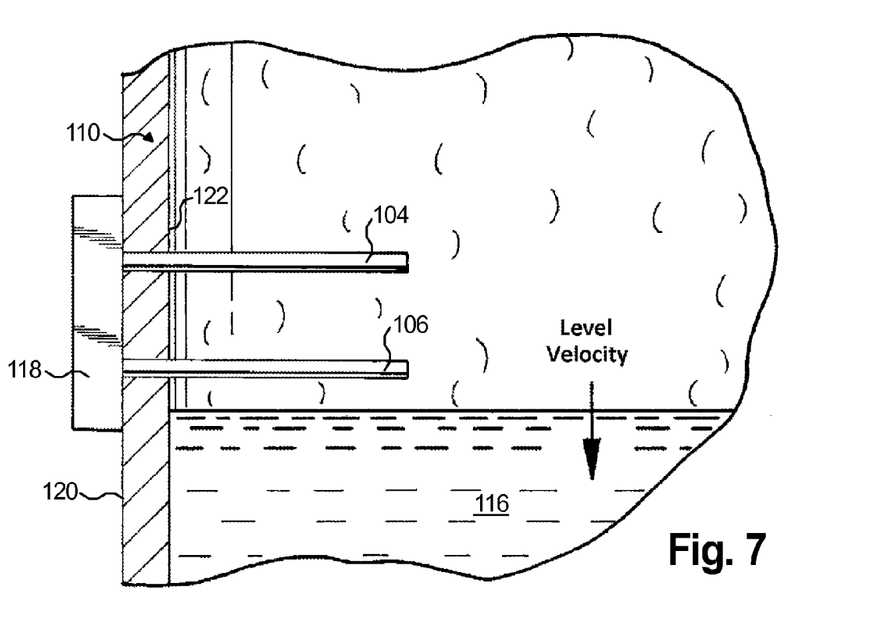
FIG. 7 is a cross-sectional view of the fuel tank of FIG. 1, showing two sensors spaced apart from one another, with the level of liquid in the tank below both of the sensors.

FIGS. 5 through 7 illustrate the draining of liquid 116 from tank 108 over a given time period. FIG. 5 illustrates sensing unit 102 with first sensing probe 104 and second sensing probe 106 at an initial time $t_0$, with both sensing probes immersed in liquid 116. At initial time $t_0$, the sensing probes are essentially isothermal, that is, first temperature T1 is equal to second temperature T2 and the difference between the two temperatures (T1–T2) is equal to zero.

As shown in FIG. 6, as the level of liquid 116 drops below first sensing probe 104, the difference (T1–T2) begins to increase. The rate of change of this difference is nearly instantaneous at the liquid-to-gas transition. As the liquid level approaches second sensing probe 106, the difference (T1–T2) approaches a maximum with the rate of change gradually decreasing. As second sensing probe 106 transitions from being immersed in liquid to being surrounded by gas, as shown in FIG. 7, the difference (T1–T2) begins to decrease and the rate of change of this difference rapidly changes in the opposite direction. This offset configuration of first sensing probe 104 and second sensing probe 106 provides rapid triggering events for detecting levels at first sensing probe 104 and second sensing probe 106, despite using sensing probes with relatively slow response times.

Figure 8:
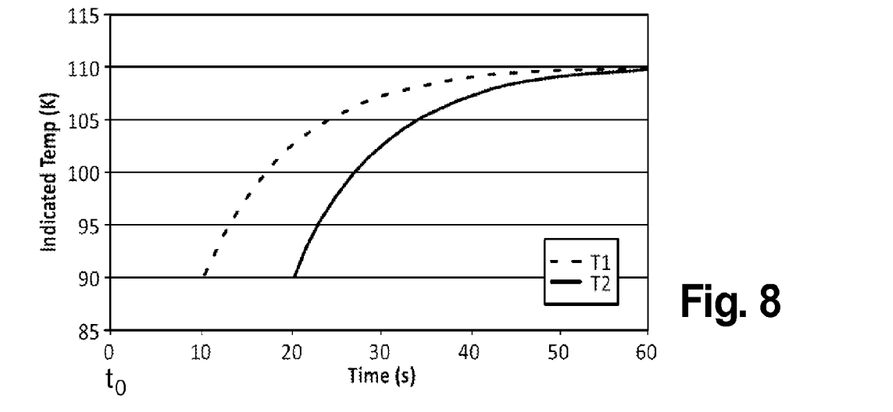
FIG. 8 is a plot of the temperature (in kelvin) measured over a given time period at a first sensor (T1) and a second sensor (T2) of the liquid level sensing system of the present invention.
Figure 9:
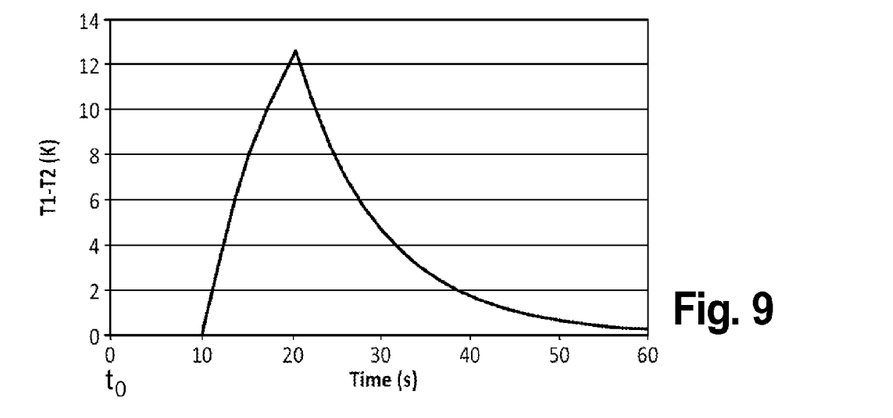
FIG. 9 is a plot of the temperature difference (T1−T2) between the temperatures measured over a given time period at the first sensor (T1) and the second sensor (T2) of the liquid level sensing system of the present invention.
Figure 10:
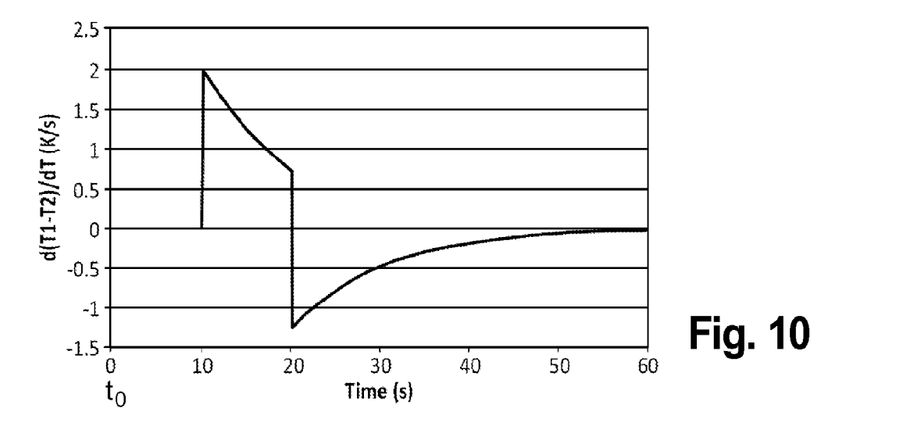
FIG. 10 is a plot of the time rate of change of the temperature difference (T1−T2) between the temperatures measured over a given time period at the first sensor (T1) and the second sensor (T2) of the liquid level sensing system of the present invention.

FIGS. 8 through 10 illustrate the changes in first temperature T1, second temperature T2, temperature difference (T1–T2) and the derivative of the temperature difference d(T1–T2)/dt for a given time period during the draining of tank 108. An initial time $t_0$, where the liquid level within the tank is at a predetermined distance above first sensing probe 104, is represented as a beginning point on the abscissa of the each of the plots shown in FIGS. 8 through 10.

FIG. 8 illustrates the temperature change at both first sensing probe 104 and second sensing probe 106. As the liquid drains from tank 108, first sensing probe 104 begins to transition from being immersed in liquid to being surrounded by gas 10 seconds after $t_0$; second sensing probe 106 begins to transition from being immersed in liquid to being surrounded by gas 10 seconds later, 20 seconds after $t_0$. As shown, both sensing probes are initially at 90 K at the initial time $t_0$, that is, the first temperature T1 and the second temperature T2 are both equal to 90 K. Ten seconds after $t_0$, first temperature T1 measured at first sensing probe 104 begins to gradually increase as a result of the increase in self-heating in gas, while T2 remains at 90 K. Twenty seconds after $t_0$, second temperature T2, measured at second sensing probe 106 also begins to gradually increase as a result of the liquid-to-gas transition. Sixty seconds after $t_0$, both first temperature T1 and second temperature T2 are have again equilibrated at a temperature of 110 K, given that the level of liquid 116 within tank 108 has now dropped below both first sensing probe 104 and second sensing probe 106 so that both probes are completely surrounded by gas.

FIG. 9 illustrates how the temperature difference (T1–T2) changes over the same time period mentioned above. At initial time $t_0$, first temperature T1 and second temperature T2 are equal, so that the temperature difference (T1–T2) is zero. Ten seconds after $t_0$, the temperature difference (T1–T2) begins to rise as first sensing probe transitions from liquid to gas. A maximum temperature difference (T1–T2) is reached 20 seconds after $t_0$, just before second sensor 106 transitions from liquid to gas. Temperature difference (T1–T2) gradually returns to zero as both first and second sensing probes equilibrate at the same gas temperature of 110 K.

FIG. 10 is a plot of the derivative of the temperature difference (T1-T2) changes over the same time period. The derivative of the temperature difference is the time rate of change of the difference between first temperature T1 and second temperature T2, that is, d(T1-T2)/dt. The derivative rapidly peaks 10 seconds after $t_0$, when first sensing probe 104 transitions from liquid to gas. After gradually decreasing, the derivative rapidly peaks again, this time in the opposite direction, 20 seconds after $t_0$, when second sensing probe 106 transitions from liquid to gas. The pulse width—the time between the rapid rise and fall—is directly related to the liquid level velocity because the distance between the two sensing probes is fixed. These rapid peaks in the time rate of change of the difference d(T1-T2)/dt can be used to trigger point level indications with rapid response time. By feeding signals representing first temperature T1 and second temperature T2 from two individual sensing probes into a differentiating circuit, the level of liquid within a tank can be determined with a response time that is faster than what either of the sensors would be capable of individually.

Figure 11:
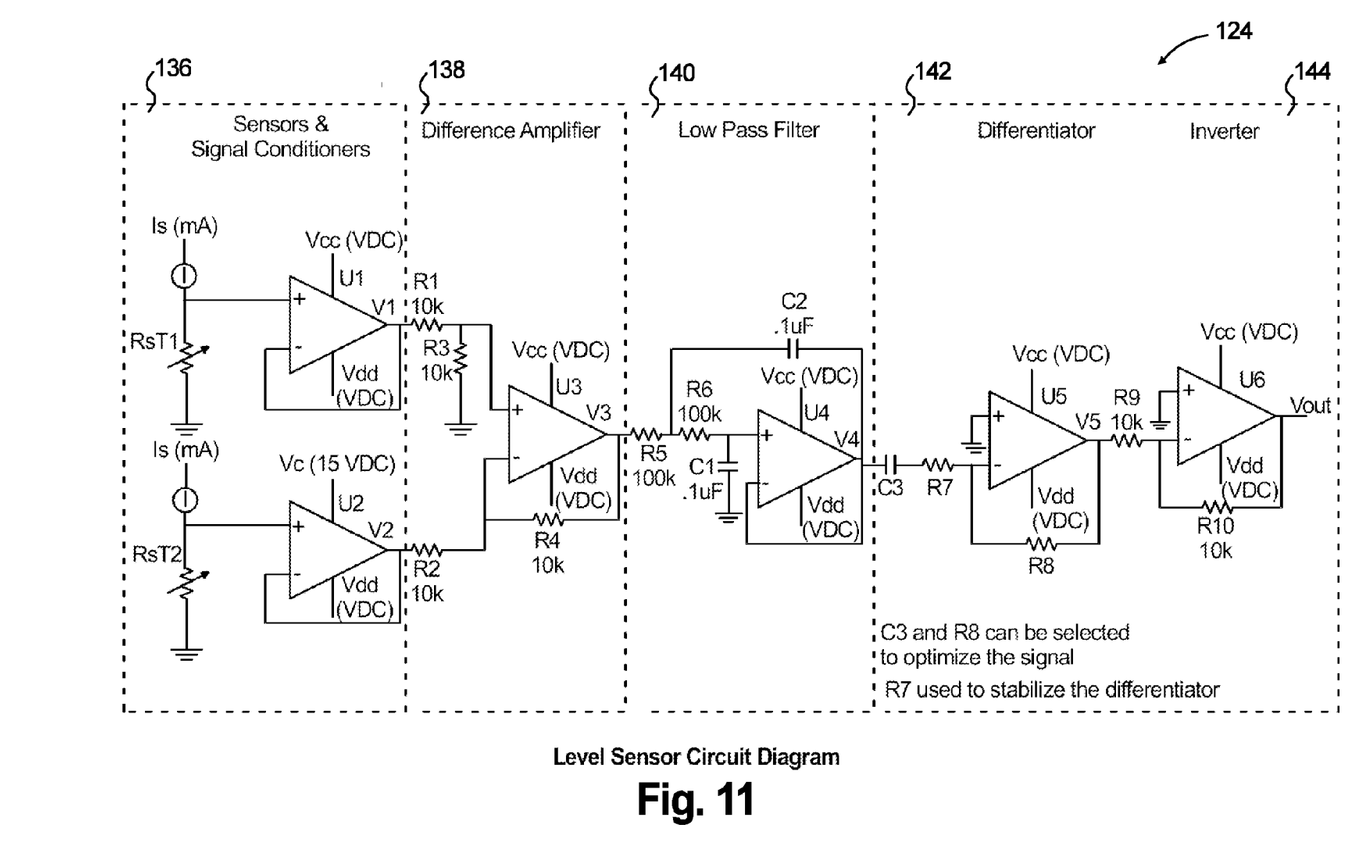
FIG. 11 is a circuit diagram illustrating an exemplary embodiment of a level sensor circuit that may be used to produce the output of the level sensing system.

FIG. 11 is a circuit diagram showing an exemplary embodiment of circuit 124 of liquid level sensing system 100. Circuit 124 provides both the excitation and signal conditional for each sensing element 128 of first sensing probe 104 and second sensing probe 106. Circuit 124 may include a signal conditioner 136, a difference amplifier 138, a low-pass filter 140, a differentiator 142, and an inverter 144.

As shown in FIG. 11, each sensing element 128 of sensing probes 104, 106 is supplied with a constant excitation current. The current is set to ensure appreciable self heating occurs in the gas present in tank 108. In one exemplary embodiment, the current is set such that the self heating increases by 10° C. or more when the sensing probes transition from liquid to gas. Signal conditioner 136 may include an operational amplifier U1 configured to function as a first voltage follower and a second operation amplifier U2 configured to function as a second voltage follower. The first voltage follower receives a first input signal proportional to the resistance measured at first sensing probe 104 and outputs a first voltage V1. Similarly, the second voltage follower receives a second input signal proportional to the resistance measured at second sensing probe 104 and outputs a second voltage V2.

Difference amplifier 138 receives first voltage V1 and second voltage V2 as inputs and generates a signal related to the difference between the two input signals (V1-V2). A difference occurs because the resistance element on first sensing probe 104 is physically separated from the resistance element on second sensing probe 106, so that the first resistance element and the second resistance element will sense a liquid to gas transition at different times. The difference amplifier includes resistors R1, R2, R3, R4, and an operation amplifier U3. In the exemplary embodiment shown, resistors R1, R2, R3, and R4 have equal resistance values, so that an output voltage V3 of difference amplifier 138 is equal to the difference between V1 and V2, that is, V3=(V1-V2).

Low-pass filter 140 receives voltage V3 as input and produces a filtered voltage V4 as output. Low-pass filter 140 contains resistors R5, R6, capacitors C1 and C2, and an operational amplifier U4, as shown in FIG. 11. Low-pass filter 140 is used to filter out the high frequency signal above its cutoff frequency (fc). The cutoff frequency is determined by the following equation:

$$fc_{filter} = 1/2\pi\sqrt{(R5 \times R6 \times C1 \times C2)}$$

In one exemplary embodiment, the cutoff frequency of the filter is commensurate with the thermal time constant of the resistance elements on the sensing probes so that the filter does not mask the sudden change in the self-heating characteristics of the resistance elements when the sensing probes transition from liquid to gas. In one exemplary embodiment, low-pass filter 140 is a Sallen-Key active filter.

Differentiator 142 receives voltage V4 from low-pass filter 140 as input and produces a voltage V5 as output. As shown in FIG. 11, differentiator 142 may include capacitor C3, resistors R7 and R8, and an operational amplifier U5. The voltage output V5 produced by differentiator 142 is proportional to the time rate of change of input voltage V4 and the current flowing through the capacitor C3. In other words, the faster the input voltage changes, the greater the input current, and the greater the output response.

Voltage V5 is a constant (-R8×C3) times the derivative of the input voltage V4 with respect to time. The minus sign indicates a 180 degree phase shift because the input signal is connected to the inverting input terminal of operation amplifier U5. The general equation for the output voltage V5 is:

$$V5 = (-R8 \times C3)(dV4/dt)$$

Parameters R8 and C3 influence the gain (i.e. signal amplitude) and circuit response. Optimum values for R8 and C3 depend on the desired output signal V5, the circuit response time, operating voltage range, element response, and element time spacing. R7 is added to the input as shown in FIG. 11 to reduce the overall closed-loop gain of the circuit at high frequencies to the ratio R8/R7 (with capacitor C3 looking like a short). The low frequency gain is still driven by R8 and C3, as before. The cutoff frequency of the differentiator, where these two effects meet, is determined by R7 and C3, according to the expression:

$$fc_{diff} = 1/(2\pi \times R7 \times C3)$$

R7 must also be selected based on circuit conditions. In general, decreasing R7 improves circuit response but increases susceptibility to noise and circuit instabilities. Increasing R7 improves circuit stability and reduces high frequency noise but slows circuit response.

Inverter 144 may optionally be included within circuit 124. Inverter 144 includes resistors R9 and R10, and an operational amplifier U6. Inverter 144 receives voltage V5 as input and outputs voltage $V_{out}$. In one exemplary embodiment, the output resistors R9 and R10 have the same resistance value so that voltage $V_{out}$ will be equal to -V5.

Figure 12:
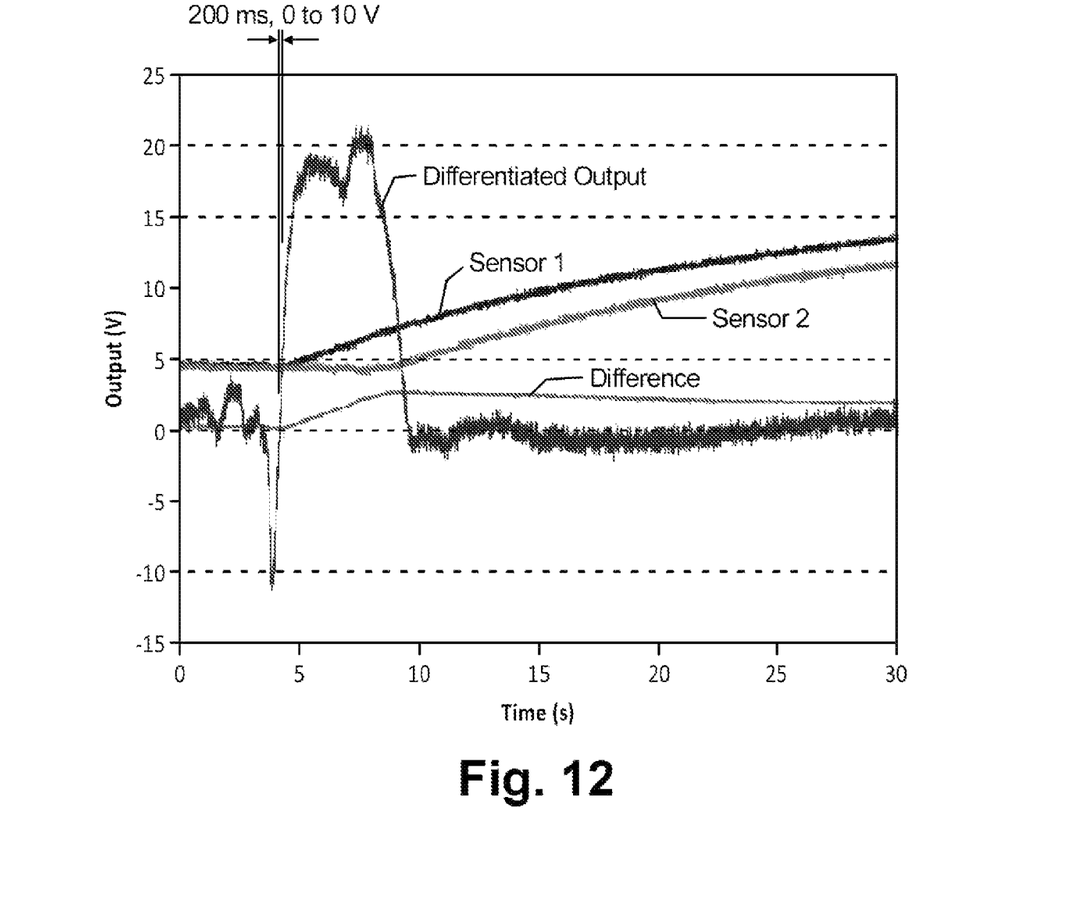
FIG. 12 shows a plot of the differential output between a first sensor and a second sensor of the liquid level sensing system of the present invention, demonstrating the rapid response of the differentiator for sensors transitioning between liquid and gas.

FIG. 12 shows the voltage output data of an embodiment of the liquid level sensing system described in this disclosure. The voltage output data demonstrates the rapid response of the differentiator for sensors transitioning between liquid nitrogen and gaseous nitrogen. This data was generated using two temperature sensing probes each having a platinum resistance thermometer with an ice-point resistance of 1000 ohms as the sensing element, with each resistance element receiving an excitation current of 21 miliamperes (mA) using the circuit configuration described above. In the differentiator, the resistance within resistor R8 was 1.5 megaohms and the capacitance of capacitor C3 was 20 microfarads (g). The voltage output from the first and second sensor, labeled as Sensor 1 and Sensor 2 in FIG. 12, corresponds to the temperature rise at the first and second sensing probes, as illustrated in FIG. 8. The voltage output from the difference amplifier corresponds to the temperature difference between the first and second sensing probes, as illustrated in FIG. 9. Finally, the differentiated output shown in FIG. 12 corresponds to the plot of the time rate of change of the temperature difference measured by the first and second sensing probes, as shown in FIG. 10. The data displayed in FIG. 12 illustrates the abrupt increase and decrease in voltage that permits liquid level sensing system 100 to rapidly detect a discrete point level of liquid within a tank.

Figure 13:
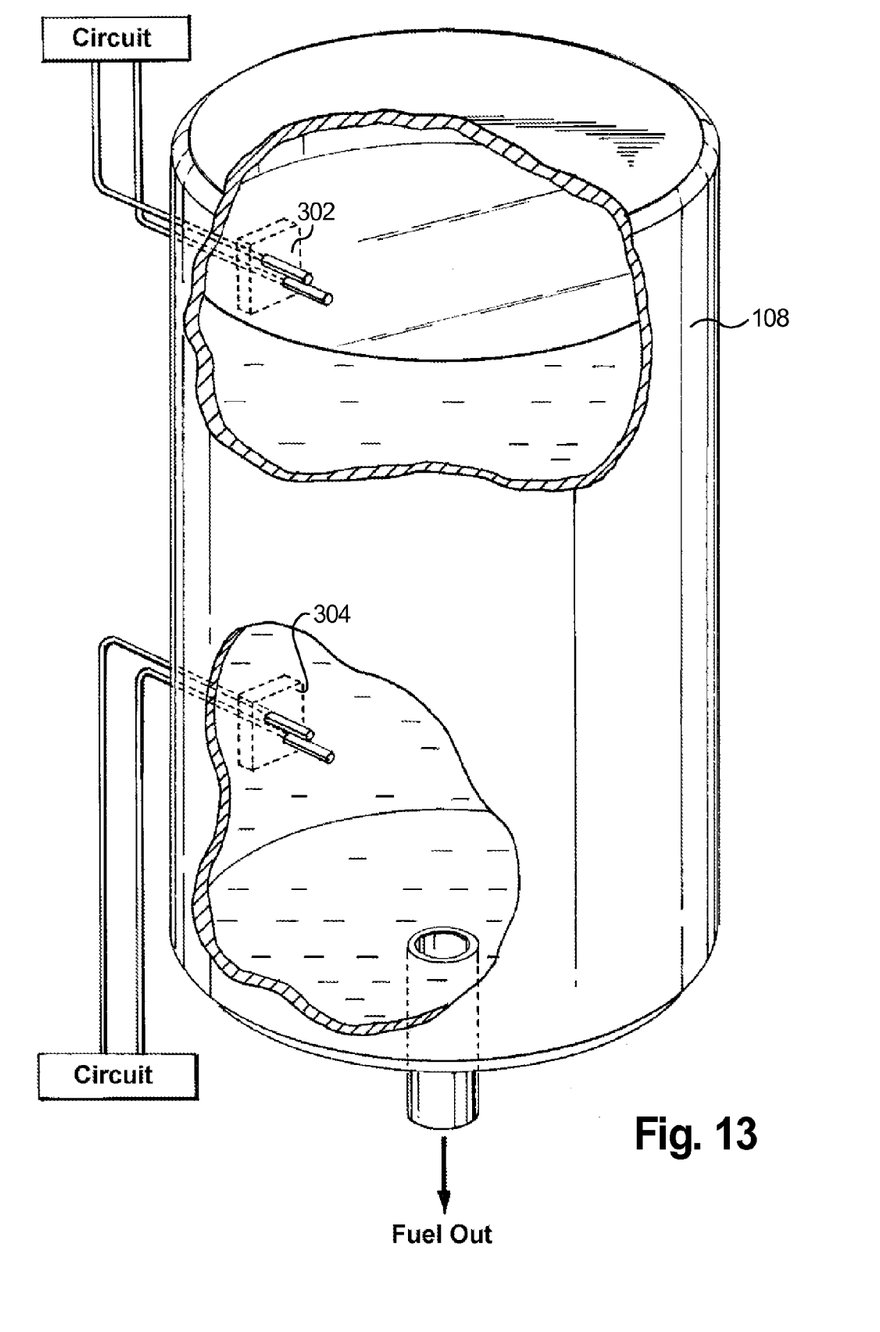
FIG. 13 is a cut-away perspective view of a fuel tank showing another exemplary embodiment of the liquid level sensing system of the present invention, the sensing system including a depletion sensor near the bottom of the tank and a filling sensor near the top of the tank.

FIG. 13 illustrates another exemplary embodiment of the liquid level sensing system. In this embodiment, tank 108 includes a first sensing unit 302 and a second sensing unit 304. First and second sensing units 302, 304 function in the same way as sensing unit 102 described above. First sensing unit 302 is positioned near the top of tank 108 and functions as a filling sensor, that is, sensing unit 302 is configured to determine when tank 108 has been filled. Second sensing unit 304 may be positioned near the bottom of the tank and be configured as a depletion sensor to determine when the tank is nearly empty.

Figure 14:
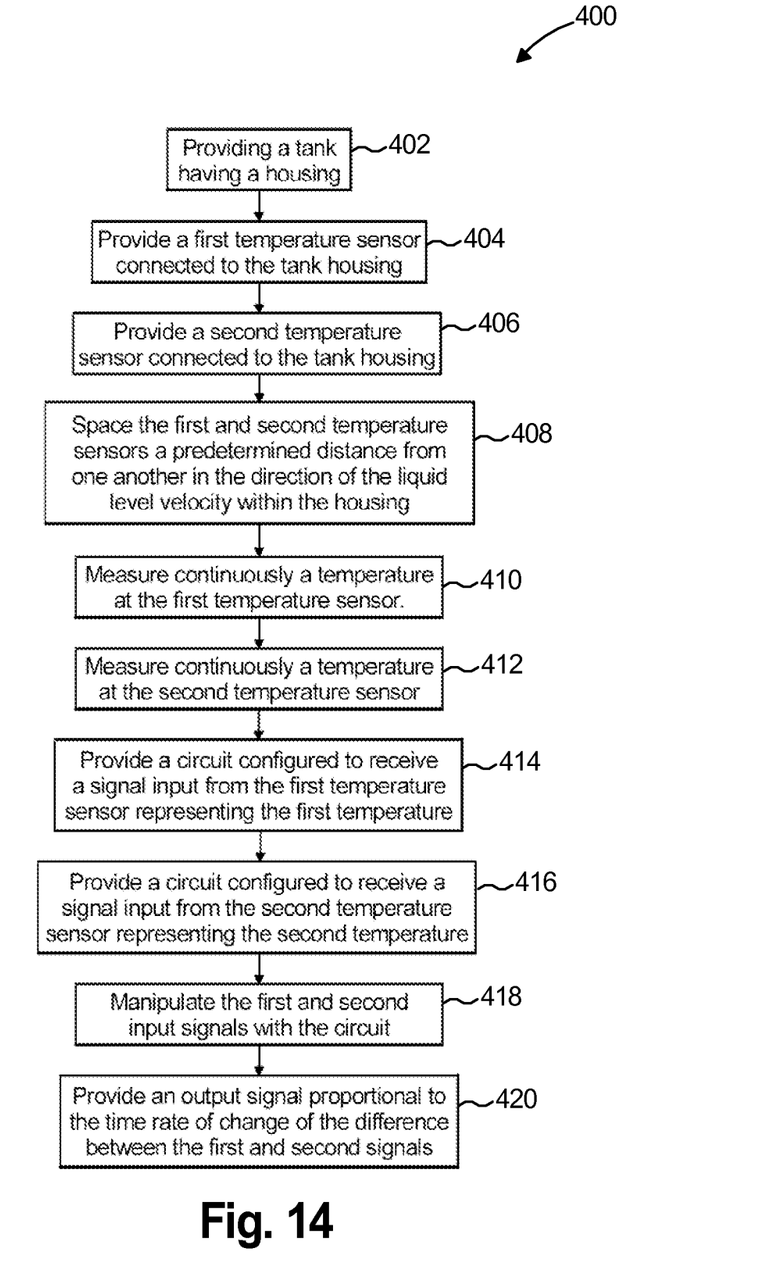
FIG. 14 shows the steps of an exemplary method of determining the level of liquid in a tank as the liquid drains from the tank, in accordance with the present invention.

FIG. 14 illustrates a method 400 of determining the level of liquid in a tank as the liquid drains from the tank. At step 402 of method 400, a tank having a housing is provided. Next, at step 404, a first temperature sensor connected to the tank housing is provided. At step 406, a second temperature sensor connected to the housing of the tank is provided. At step 408, the first and second temperature sensors are spaced a predetermined distance apart within the tank in the direction of the liquid level velocity. At step 410, the first temperature sensor continuously measures the temperature at the first sensor. At step 412, the second temperature sensor continuously measures the temperature at the second sensor. At step 414, a circuit is provided, the circuit being configured to receive a signal input from the first temperature sensor representing the temperature at the first sensor. At step 416, the circuit receives a signal input from the second temperature sensor representing the temperature at the second sensor. At step 418, the circuit manipulates the first and second input signals, and at step 420, the circuit provides an output signal that is proportional to the time rate of change of the difference between the first signal and the second signal. This method allows for detection of abrupt changes in the time rate of change of the difference between the signals, which serves as an indication of when the liquid in the tank is passing by the sensors.

While the systems and methods for liquid level sensing having a differentiating output have been shown and described with reference to preferred embodiments, those skilled in the art will readily appreciate that various modifications may be made to the systems and methods of this disclosure without departing from the scope of the invention as described in the appended claims and their equivalents.

The invention claimed is:

1. A liquid level sensing system, comprising:
a housing configured to hold a liquid;
a first temperature sensor connected to the housing and configured to output a first signal representing a first temperature measured at the first temperature sensor;
a second temperature sensor connected to the housing and configured to output a second signal representing a second temperature measured at the second temperature sensor; and
a circuit configured to receive the first and second signals as input and to provide an output signal proportional to the time rate of change of the difference between the first signal and the second signal, wherein the circuit includes a differentiator configured and adapted to receive an input signal based on the first and second signals received by the circuit for determining a liquid level within the housing with a faster response time than that of either of the first and second sensors.

2. The sensing system of claim 1, wherein the first temperature sensor and the second temperature sensor are spaced apart by a predetermined distance in the direction of liquid level velocity.

3. The sensing system of claim 1, wherein the first temperature sensor and the second temperature sensor are spaced apart by a predetermined distance in the direction of liquid level velocity as well as in the direction perpendicular to liquid level velocity.

4. The sensing system of claim 1, wherein the first and second temperature sensors each comprise an elongate body with a proximal end attached to a base and a distal end positioned away from the base.

5. The sensing system of claim 4, wherein the elongate body is supported within the housing such that the distal end of the elongate body is a predetermined distance above the proximal end of the elongate body such that an acute angle is formed between the elongate body and the direction of liquid level velocity.

6. The sensing system of claim 5, wherein the acute angle is approximately 75 degrees.

7. The sensing system of claim 4, wherein each of the first and second temperature sensors further comprises a resistive sensing element supported by at least a portion of the distal end of the elongate body.

8. The sensing system of claim 7, wherein the resistive sensing element is deposited as wrapped wire.

9. The sensing system of claim 7, wherein the resistive sensing element is deposited as film.

10. The sensing element of claim 7, wherein the resistive sensing element is comprised of platinum.

11. The sensing system of claim 7, wherein each of the first and second temperature sensors further comprises a smooth surface configured to facilitate liquid run-off away from the resistive sensing element.

12. The sensing system of claim 7, wherein each of the first and second temperature sensors further comprises a non-wetting coating to facilitate liquid run-off away from the resistive sensing element.

13. The sensing system of claim 1, wherein the circuit comprises a signal conditioner.

14. The sensing system of claim 1, wherein the circuit comprises a difference amplifier.

15. The sensing system of claim 1, wherein the circuit comprises a low-pass filter.

16. The sensing system of claim 1, wherein the circuit comprises an inverter.

17. A method of determining the level of liquid in a tank as the liquid drains from the tank, the method comprising:
providing a tank having a housing;
providing a first temperature sensor and a second temperature sensor, each sensor being connected to the housing and being spaced apart a predeteimined distance from one another in the direction of liquid level velocity in the tank;
continuously measuring a first temperature at the first temperature sensor;
continuously measuring a second temperature at the second temperature sensor;
providing a circuit configured to receive a first input signal from the first temperature sensor representing the first temperature and a second input signal from the second temperature sensor representing the second temperature;
manipulating the first and second input signals within the circuit to provide an output signal proportional to the time rate of change of the difference between the first signal and the second signal; and determining liquid level within the tank with a response time that is faster than that of either of the first and second temperature sensors.

18. The method of claim 17, further comprising spacing apart the first temperature sensor and the second temperature sensor by a predetermined distance in the direction perpendicular to liquid level velocity.

19. The method of claim 17, wherein the step of providing a first temperature sensor and a second temperature sensor comprises providing a sensors that each include an elongate body with a proximal end attached to a base and a distal end positioned away from the base.

20. The method of claim 19, further comprising mounting the elongate body to the housing such that the distal end of the elongate body is a predetermined distance above the proximal end of the elongate body such that an acute angle is formed between the elongate body and the direction of liquid level velocity.

21. The method of claim 20, wherein the acute angle is approximately 75 degrees.

22. A fuel level sensing system for detecting the filling and draining of fuel within a tank, the system comprising:

a fuel tank configured to hold a quantity of liquid fuel;

a depletion sensing unit mounted within the tank near a bottom portion of the tank, the depletion sensing unit comprising a first temperature sensor configured to output a first signal representing a first temperature measured at the first temperature sensor, a second temperature sensor configured to output a second signal representing a second temperature measured at the second temperature sensor, and a first circuit configured to receive the first and second signals as input and to provide a first output signal proportional to the time rate of change of the difference between the first signal and the second signal, wherein the first circuit includes a differentiator configured and adapted to receive an input signal based on the first and second signals received by the first circuit for determining a liquid level within the housing with a faster response time than that of either of the first and second sensors; and a filling sensing unit mounted within the tank near a top portion of the tank, the filling sensing unit comprising a third temperature sensor configured to output a third signal representing a third temperature measured at the third temperature sensor, a fourth temperature sensor configured to output a fourth signal representing a fourth temperature measured at the fourth temperature sensor, and a second circuit configured to receive the third and fourth signals as input and to provide a second output signal proportional to the time rate of change of the difference between the third signal and the fourth signal.

* * * * *